US006461562B1

(12) United States Patent
Solntsev et al.

(10) Patent No.: US 6,461,562 B1
(45) Date of Patent: Oct. 8, 2002

(54) METHODS OF MAKING SINTERED METAL OXIDE ARTICLES

(75) Inventors: Konstantin Solntsev, Moscow (RU); Eugene Shustorovich, Pittsford, NY (US); Sergei Myasoedov; Vyacheslav Morgunov, both of Moscow (RU); Andrei Chernyavsky, Dubna (RU); Yuri Buslaev, Moscow (RU); Richard Montano, Falls Church, VA (US); Alexander Shustorovich, Pittsford, NY (US)

(73) Assignee: American Scientific Materials Technologies, LP, New York, NY (US)

( * ) Notice: Subject to any disclaimer, the term of this patent is extended or adjusted under 35 U.S.C. 154(b) by 0 days.

(21) Appl. No.: 09/251,348

(22) Filed: Feb. 17, 1999

(51) Int. Cl.⁷ .............................................. C04B 33/32
(52) U.S. Cl. ......................... 264/646; 264/648; 264/658
(58) Field of Search .................................. 264/646, 648, 264/658

(56) References Cited

U.S. PATENT DOCUMENTS

| | | | |
|---|---|---|---|
| 2,201,709 A | 5/1940 | Williams et al. | |
| 2,205,263 A | 6/1940 | Hein | |
| 2,462,289 A | 2/1949 | Rochow | |
| 2,727,842 A | 12/1955 | Vermiji et al. | |
| 2,917,419 A | 12/1959 | Robinson | |
| 3,344,925 A | 10/1967 | Graham | |
| 3,470,067 A | 9/1969 | Warren et al. | |
| 3,505,030 A | 4/1970 | Sowards | |
| 3,581,902 A | 6/1971 | Bidler | |
| 3,597,892 A | 8/1971 | Farrington | |
| 3,630,675 A | 12/1971 | Prasky et al. | |
| 3,647,534 A * | 3/1972 | Rice, Jr. ..................... | 117/212 |
| 3,660,173 A | 5/1972 | Matsuno et al. | |
| 3,667,270 A | 6/1972 | Deurloo | |
| 3,705,057 A | 12/1972 | Kelp | |
| 3,746,642 A | 7/1973 | Bergstrom | |
| 3,766,642 A | 10/1973 | Schlaudt et al. | |
| 3,849,115 A | 11/1974 | Ban | |
| 3,860,450 A | 1/1975 | Nicolet et al. | |
| 3,892,888 A | 7/1975 | Halaby et al. | |
| 3,896,028 A | 7/1975 | Phillips, Jr. | |
| 3,903,341 A | 9/1975 | Gerhold | |
| 3,930,522 A | 1/1976 | Turner | |
| 3,945,946 A | 3/1976 | Hindin et al. | |
| 3,947,502 A | 3/1976 | Leitner et al. | |
| 3,948,785 A * | 4/1976 | Berchtold ................ | 252/62.62 |
| 3,948,810 A | 4/1976 | Hervert | |
| 3,966,419 A | 6/1976 | Bloomfield | |
| 3,975,186 A | 8/1976 | Grebe et al. | |
| 3,976,432 A | 8/1976 | Schwarz et al. | |
| 3,980,465 A | 9/1976 | Nishida et al. | |
| 3,984,229 A | 10/1976 | Gorling | |
| 3,986,985 A | 10/1976 | Dewdney et al. | |
| 3,992,330 A | 11/1976 | Noakes et al. | |
| 4,006,090 A | 2/1977 | Beck | |
| 4,019,239 A | 4/1977 | Bockstiegel | |
| 4,025,462 A | 5/1977 | Cleveland | |
| 4,035,200 A | 7/1977 | Valentijn | |
| 4,042,738 A | 8/1977 | Gulati | |
| 4,050,956 A | 9/1977 | de Bruin et al. | |
| 4,052,326 A | 10/1977 | Schöenafinger et al. | |
| 4,054,443 A | 10/1977 | Jaco, Jr. | |
| 4,054,627 A * | 10/1977 | Ownby ........................ | 106/66 |
| 4,054,705 A | 10/1977 | Vassiliou | |
| 4,063,930 A | 12/1977 | Kusner et al. | |
| 4,070,440 A | 1/1978 | Moriguchi | |
| 4,118,225 A | 10/1978 | Dobo | |

(List continued on next page.)

FOREIGN PATENT DOCUMENTS

| | | |
|---|---|---|
| CA | 475288 | 7/1951 |
| GB | 709937 | 6/1954 |
| GB | 760166 | 10/1956 |

OTHER PUBLICATIONS

Solid State Sintering Encyclopedia of Material Science and Engineering, vol. 6, M.B. Bever, Ed., Pergaman Press, 1986; one page.

Controlled Atmosphere Tempering, Metal Progress, Ipsen et al., Oct. 1952; pp. 123–128.

Ipsen et al., Controlled Atmosphere Tempering, reprint from Oct. 1952 Metal Progress, pp. 123–128. Oct., 1952.

Sittig, M.; Handbook of Toxic and Hazardous Chemicals and Carcinogens, Third Edition; 1991, vol. 2, G–Z, Noyes Publications; p. 867.

Lewis, Sr., Richard J.; Hazardous Chemicals Desk Reference, Third Edition, 1993, Van Nostrand Reinhold, pp. 652, 653.

Osha, US Dept of Labor, Osha Regulated Hazardous Substances, Health, Toxicity, Economic and Technological Data, vol. 1, A–1, 1990; Noyes Data Corporation, pp. 1090–1095.

(List continued on next page.)

Primary Examiner—Christopher A. Fiorilla
(74) Attorney, Agent, or Firm—Kenyon & Kenyon

(57) ABSTRACT

Methods of making metal oxide articles, preferably iron oxide articles, and articles thereby produced. The method comprises the steps of slightly pressing powder to a compact, the powder consisting essentially of a first oxide of the metal; and subjecting the compact to a heat treatment that causes the powder to sinter into a unitary body and results in the transformation of at least a portion of the first oxide to a second oxide by oxidation or deoxidation during the heat treatment. In disclosed embodiments, the heat treatment is conducted either in air at atmospheric pressure or at a subatmospheric pressure. The method optionally includes more heating/cooling steps resulting in additional oxidation/deoxidation cycles. Sintered iron oxide articles of the invention have high mechanical strengths and interconnected pore structures, providing for efficient filtering of liquids and gases.

30 Claims, No Drawings

U.S. PATENT DOCUMENTS

| | | |
|---|---|---|
| 4,127,691 A | 11/1978 | Frost |
| 4,157,929 A | 6/1979 | Kubicek |
| 4,162,993 A | 7/1979 | Retallick |
| 4,170,497 A | 10/1979 | Thomas et al. |
| 4,170,499 A | 10/1979 | Thomas et al. |
| 4,177,307 A | 12/1979 | Torii et al. |
| 4,179,412 A | 12/1979 | Inaba et al. |
| 4,186,100 A | 1/1980 | Mott |
| 4,189,331 A | 2/1980 | Roy |
| 4,209,412 A | 6/1980 | Marcot |
| 4,213,959 A | 7/1980 | Brodt et al. |
| 4,218,430 A | 8/1980 | Biggerstaff |
| 4,221,614 A | 9/1980 | Yoda et al. |
| 4,233,169 A | 11/1980 | Beall et al. |
| 4,247,422 A | 1/1981 | Davies |
| 4,259,106 A | 3/1981 | Aaltonen et al. |
| 4,264,346 A | 4/1981 | Mann |
| 4,273,681 A | 6/1981 | Nonnenmann |
| 4,274,029 A | 6/1981 | Buxbaum |
| 4,295,818 A | 10/1981 | Angwin et al. |
| 4,296,050 A | 10/1981 | Meier |
| 4,308,173 A | 12/1981 | Fujimori et al. |
| 4,363,652 A | 12/1982 | Kowbuz |
| 4,364,760 A | 12/1982 | Higuchi et al. |
| 4,367,214 A | 1/1983 | Sarnecki et al. |
| 4,382,323 A | 5/1983 | Chapman et al. |
| 4,392,991 A | 7/1983 | Yannopoulos et al. |
| 4,395,271 A | 7/1983 | Beall et al. |
| 4,400,337 A | 8/1983 | Hayashi et al. |
| 4,402,871 A | 9/1983 | Retallick |
| 4,425,250 A | 1/1984 | Hibst |
| 4,448,833 A | 5/1984 | Yamaguchi et al. |
| 4,451,517 A | 5/1984 | Inoguchi et al. |
| 4,459,368 A | 7/1984 | Jaffee et al. |
| 4,464,352 A | 8/1984 | Autzen et al. |
| 4,478,648 A | 10/1984 | Zeilinger et al. |
| 4,480,051 A | 10/1984 | Wu |
| 4,495,074 A | 1/1985 | Hagiwara et al. |
| 4,510,261 A | 4/1985 | Pereira et al. |
| 4,520,124 A | 5/1985 | Abe et al. |
| 4,545,974 A | 10/1985 | Thompson |
| 4,550,098 A | 10/1985 | Gens |
| 4,576,800 A | 3/1986 | Retallick |
| 4,598,062 A | 7/1986 | Schneider et al. |
| 4,598,063 A | 7/1986 | Retallick |
| 4,664,831 A | 5/1987 | Hibst et al. |
| 4,668,658 A | 5/1987 | Jennings |
| 4,671,827 A | 6/1987 | Thomas et al. |
| 4,673,553 A | 6/1987 | Retallick |
| 4,677,839 A | 7/1987 | Retallick |
| 4,703,030 A | 10/1987 | Khader et al. |
| 4,707,184 A | 11/1987 | Hashiguchi et al. |
| 4,711,009 A | 12/1987 | Cornelison et al. |
| 4,711,930 A | 12/1987 | Hoelderich et al. |
| 4,713,360 A | 12/1987 | Newkirk et al. |
| 4,714,497 A | 12/1987 | Poncet |
| 4,719,090 A | 1/1988 | Masaki |
| 4,722,750 A | 2/1988 | Saito et al. |
| 4,729,982 A | 3/1988 | Thistlethwaite et al. |
| 4,740,408 A | 4/1988 | Mochida et al. |
| 4,742,036 A | 5/1988 | Flockenhaus et al. |
| 4,743,578 A | 5/1988 | Davidson |
| 4,751,212 A | 6/1988 | Flockenhaus et al. |
| 4,772,579 A | 9/1988 | Thistlethwaite et al. |
| 4,780,213 A | 10/1988 | Ogletree |
| 4,782,570 A | 11/1988 | Spridco |
| 4,789,659 A | 12/1988 | Maat |
| 4,792,982 A | 12/1988 | Devos et al. |
| 4,795,616 A | 1/1989 | Mondt et al. |
| 4,797,383 A | 1/1989 | Topham |
| 4,798,622 A | 1/1989 | Pinguad |
| 4,810,290 A | 3/1989 | Saito et al. |
| 4,810,554 A | 3/1989 | Hattori et al. |
| 4,822,660 A | 4/1989 | Lipp |
| 4,835,044 A | 5/1989 | Hattori et al. |
| 4,845,073 A | 7/1989 | Cyron |
| 4,847,225 A | 7/1989 | Lussier |
| 4,849,274 A | 7/1989 | Cornelison |
| 4,851,375 A | 7/1989 | Newkirk et al. |
| 4,853,352 A | 8/1989 | Newkirk et al. |
| 4,859,433 A | 8/1989 | Pereira et al. |
| 4,869,944 A | 9/1989 | Harada et al. |
| 4,870,045 A | 9/1989 | Gasper et al. |
| 4,871,693 A | 10/1989 | Inoue et al. |
| 4,882,130 A | 11/1989 | Asai et al. |
| 4,882,306 A | 11/1989 | Kennedy et al. |
| 4,883,420 A | 11/1989 | Ozaki et al. |
| 4,884,960 A | 12/1989 | Chao |
| 4,891,345 A | 1/1990 | Nadkarni et al. |
| 4,898,699 A | 2/1990 | Hofmann et al. |
| 4,902,216 A | 2/1990 | Cunningham et al. |
| 4,913,980 A | 4/1990 | Rowcliffe et al. |
| 4,923,109 A | 5/1990 | Cyron |
| 4,928,485 A | 5/1990 | Whittenberger |
| 4,958,428 A | 9/1990 | Humpolik |
| 4,964,926 A | 10/1990 | Hill |
| 4,969,265 A | 11/1990 | Ehara |
| 4,976,929 A | 12/1990 | Cornelison et al. |
| 4,977,129 A | 12/1990 | Ernest |
| 4,979,889 A | 12/1990 | Frost |
| 4,985,388 A | 1/1991 | Whittenberger |
| 4,999,336 A | 3/1991 | Nadkarni et al. |
| 5,001,014 A | 3/1991 | Charles et al. |
| 5,013,232 A | 5/1991 | Way |
| 5,017,526 A | 5/1991 | Newkirk et al. |
| 5,021,527 A | 6/1991 | Ohmori et al. |
| 5,025,649 A | 6/1991 | Retallick |
| 5,051,294 A | 9/1991 | Lunkas et al. |
| 5,057,482 A | 10/1991 | Fukuda et al. |
| 5,058,381 A | 10/1991 | Christenson et al. |
| 5,059,489 A | 10/1991 | Buckwalter, Jr. et al. |
| 5,063,769 A | 11/1991 | Retallick |
| 5,068,218 A | 11/1991 | Nishizawa |
| 5,082,700 A | 1/1992 | Dwivedi |
| 5,089,047 A | 2/1992 | Buljan et al. |
| 5,093,178 A | 3/1992 | Sundstrom et al. |
| 5,094,906 A | 3/1992 | Witzke et al. |
| 5,108,685 A | 4/1992 | Kragle |
| 5,110,561 A | 5/1992 | Hitachi et al. |
| 5,116,659 A | 5/1992 | Glatzle et al. |
| 5,118,475 A | 6/1992 | Cornelison |
| 5,118,477 A | 6/1992 | Takikawa et al. |
| 5,130,208 A | 7/1992 | Maus et al. |
| 5,139,844 A | 8/1992 | Maus et al. |
| 5,145,822 A | 9/1992 | Falke et al. |
| 5,149,508 A | 9/1992 | Bullock |
| 5,157,010 A | 10/1992 | Manus et al. |
| 5,170,624 A | 12/1992 | Cornelison et al. |
| 5,171,503 A | 12/1992 | Peters et al. |
| 5,174,968 A | 12/1992 | Whittenberger |
| 5,180,450 A | 1/1993 | Rao |
| 5,183,609 A | 2/1993 | Miyahara |
| 5,185,300 A | 2/1993 | Hoggard et al. |
| 5,198,006 A | 3/1993 | Mimori et al. |
| 5,214,011 A | 5/1993 | Breslin |
| 5,217,939 A | 6/1993 | Campbell |
| 5,238,886 A | 8/1993 | Luszcz et al. |
| 5,240,682 A | 8/1993 | Cornelison et al. |
| 5,242,882 A | 9/1993 | Campbell |
| 5,244,494 A | 9/1993 | Cavanagh |
| 5,244,649 A | 9/1993 | Ostertag et al. |
| 5,256,242 A | 10/1993 | Imaeda et al. |

| | | |
|---|---|---|
| 5,264,294 A | 11/1993 | Noel et al. |
| 5,268,339 A | 12/1993 | Aghajanian et al. |
| 5,269,926 A | 12/1993 | Webster et al. |
| 5,272,876 A | 12/1993 | Sheller |
| 5,281,462 A | 1/1994 | Day et al. |
| 5,288,345 A | 2/1994 | Ohhashi et al. |
| 5,300,234 A | 4/1994 | Oechsle et al. |
| 5,314,750 A | 5/1994 | Takedoi et al. |
| 5,318,953 A | 6/1994 | Hughes |
| 5,330,728 A | 7/1994 | Foster |
| 5,332,703 A | 7/1994 | Hickman |
| 5,342,431 A | 8/1994 | Anderson et al. |
| 5,358,575 A | 10/1994 | Nakagawa et al. |
| 5,364,586 A | 11/1994 | Trusov et al. |
| 5,370,920 A | 12/1994 | Forsythe et al. |
| 5,372,893 A | 12/1994 | Usui |
| 5,382,558 A | 1/1995 | Inagaki et al. |
| 5,394,610 A | 3/1995 | Steophasius et al. |
| 5,415,772 A | 5/1995 | Garcera et al. |
| 5,415,891 A | 5/1995 | Liu et al. |
| 5,441,648 A | 8/1995 | Lidzey |
| 5,451,245 A | 9/1995 | Nomura et al. |
| 5,453,108 A | 9/1995 | Isaksson et al. |
| 5,458,437 A | 10/1995 | Jaffe et al. |
| 5,468,384 A | 11/1995 | Garcera et al. |
| 5,486,220 A | 1/1996 | Honda et al. |
| 5,487,771 A | 1/1996 | Zeller |
| 5,489,344 A | 2/1996 | Martin et al. |
| 5,490,938 A | 2/1996 | Sawan et al. |
| 5,496,646 A | 3/1996 | Bacigalupo |
| 5,497,129 A | 3/1996 | Mantese et al. |
| 5,505,903 A | 4/1996 | Schrey et al. |
| 5,512,195 A * | 4/1996 | Mano et al. ............. 252/62.56 |
| 5,518,624 A | 5/1996 | Filson et al. |
| 5,529,602 A | 6/1996 | Ishii et al. |
| 5,545,264 A | 8/1996 | Hashimoto |
| 5,602,442 A | 2/1997 | Jeong |
| 5,639,704 A | 6/1997 | Inuzuka et al. |
| 5,643,436 A | 7/1997 | Ogawa et al. |
| 5,653,924 A | 8/1997 | Ishibashi et al. |
| 5,668,076 A | 9/1997 | Yamagushi et al. |
| 5,670,583 A | 9/1997 | Wellinghoff |
| 5,672,427 A | 9/1997 | Hagiwara et al. |
| 5,703,002 A | 12/1997 | Towata et al. |
| 5,723,799 A | 3/1998 | Murayama et al. |
| H1718 H * | 4/1998 | Ferrando et al. |
| 5,770,310 A | 6/1998 | Noguchi et al. |
| 5,776,264 A | 7/1998 | McCandlish et al. |
| 5,786,296 A | 7/1998 | Shustorovich et al. |
| 5,800,000 A | 9/1998 | Shockley |
| 5,800,925 A | 9/1998 | Ando et al. |
| 5,814,164 A | 9/1998 | Shustorovich et al. |
| 5,834,057 A | 11/1998 | Edelstein et al. |
| 5,874,153 A | 2/1999 | Bode et al. |
| 5,876,866 A | 3/1999 | McKee et al. |
| 6,170,487 B1 * | 1/2001 | Ishiguro et al. ............. 128/897 |

OTHER PUBLICATIONS

German, Randall M., "Fundamentals of Sintering" Engineered Materials Handbook, Ceramics and Glasses, vol. 4, 1991, ASM International, pp. 260–269.

Haggerty, John S., "Reaction Sintering", Engineered Materials Handbook, Ceramics and Glasses, vol. 4, 1991, ASM International, pp. 291–295.

Bradley, David R., and Braley David R., "The Standardization of Advanced Ceramics" Advanced Ceramic Materials, Society, vol. 3, No. 5, 1988, pp. 442–448.

Lankford, Jr., William T. et al, "The Making, Shaping and Treating of Steel" Tenth Edition, US Steel, p. 730.

Ericsson, Torsten, "Principles of Heat Treating of Steels", ASM Handbook, vol. 4 —Heat Treating, 1991, pp. 3–19.

Bramfitt et al, "Annealing of Steel", ASM Handbook, vol. 4 –Heat Treating, 1991, pp. 42—55.

Pradhan, R., "Continuous Annealing of Steel", ASM Handbook, vol. 4 —Heat Treating, 1991, pp. 56–62.

"Basic Heat Treatment", Chapter 10, ASM International 1991, Ferrous Physical Metallurgy 1991, pp. 403–425.

"Defects in Heat Treated Parts" Chapter 15, ASM International 1991, Ferrous Physical Metallurgy, pp. 749–791.

Moya et al., Encyl. Of Physical Science and Technology, vol. 12, R.A. Meyers, Ed., 1987, pp. 699–712; Academic Press.

* cited by examiner

METHODS OF MAKING SINTERED METAL OXIDE ARTICLES

FIELD OF THE INVENTION

The present invention relates to methods of making sintered metal oxide articles having desired mechanical properties and interconnected pore structures, and oxide articles thereby produced.

BACKGROUND

Sintering of inorganic powder compacts into useful solid products is a common and efficient way of fabricating metals, ceramics, and cermets. The general pattern of ceramic sintering includes three stages—initial, intermediate, and final. In the initial stage, the pore shape may vary greatly depending on the size and geometry of particle contacts, and the pore structure is open and fully interconnected. In the intermediate stage, where the porosity typically shrinks to 40–10%, the pores become smoother and typically have a cylindrical structure that remains interconnected. The open pore network becomes unstable when the porosity is reduced to about 8%; then, the cylindrical pores collapse into spherical pores, which become closed and isolated. The appearance of isolated pores manifests the beginning of the final stage of sintering, leading to the densest products.

Major efforts in ceramic sintering have been made to obtain advanced materials such as electronic ceramics, structural ceramics, and high toughness composites where desired properties are sought to be reached at maximal densification (minimal porosity). The use of ceramic materials that have been sintered through only the intermediate sintering stage, however, has been more limited. One such use of these materials is in the filtration of gases and liquids. Among ceramic metal oxides, filter materials which have been obtained are commonly made of alumina ($Al_2O_3$), zirconia ($ZrO_2$), and aluminum-silicates.

The intrinsic properties of iron oxides, hematite ($\alpha$-$Fe_2O_3$) and magnetite ($Fe_3O_4$), make them well-suited for diverse applications. These oxides are among the least expensive and naturally abundant substances. They are refractory ceramic materials that are chemically stable in various gas and liquid media, hematite being particularly appropriate for use in corrosive and oxidative environments. Furthermore, hematite and magnetite are environmentally benign, which make them suitable for water filtration and various applications in food, wine, pharmaceutical and other industries where environmental and health requirements are paramount. Moreover, hematite is electrically non-conductive and non-magnetic, and magnetite is highly conductive and magnetic, so the two iron oxides cover a wide spectrum of desirable electric and magnetic properties.

There exist numerous methods to prepare hematite and magnetite powders to be used as powders in various applications. However, there is a need in efficient and practical (economical) processes of making mechanically strong hematite and magnetite articles by sintering the respective powders, particularly into filter materials. U.S. Pat. No. 3,984,229 discusses attempts to briquette iron oxide raw materials at elevated temperatures of 800° C. to 1100° C. and concludes that it has been impossible to find a sufficiently strong material for the briquette molds (col. 1, lines 60–68). U.S. Pat. No. 5,512,195 describes efficient transformation of hematite powder into a magnetite single phase by mixing hematite powder with various organic substances, serving as a binder and reducing agent, and sintering at 1200° C. to 1450° C. in an inert gas. The strength of the sintered magnetite phase and its pore structure have not been characterized.

To obtain strong sintered articles, high pressure is conventionally employed. For example, U.S. Pat. No. 4,019,239 describes manufacturing magnetite articles by sintering and hot compacting magnetite powder in air at 900° C. to 1300° C. and a pressure of 100 to 600 MPa (1000 to 6000 atm), leading to a dense body with a porosity less than 3%.

In addition to high pressure requirements, conventional sintering of metal oxide powders usually requires binders and other extraneous agents to shape a powder preform and obtain the desirable composition. For example, in U.S. Pat. No. 5,512,195, sintering of hematite powder to a magnetite single phase requires mixing hematite powder with various organic substances that serve as binders and reducing agents. By contrast, the sintering of hematite powder without incorporation of any organic substance at 1200° C. to 1450° C. in an inert gas makes the hematite-magnetite conversion so low that the process is unfit for industrialization. It would be highly desirable to develop an effective and economical sintering process of iron oxides without the use of any additives or high pressures.

SUMMARY OF THE INVENTION

In one aspect, the present invention includes a method of making metal oxide articles, and preferably iron oxide articles. The method comprises the steps of slightly pressing powder to a compact, the powder consisting essentially of a first oxide of the metal; and subjecting the compact to a heat treatment that causes the powder to sinter into a unitary body and results in the transformation of at least a portion of the first oxide to a second oxide of the metal. The powder comprises a first oxide that is substantially free from additives, at least a portion of which is transformed to a second oxide by oxidation or deoxidation during the method of the present invention. The method optionally includes one or more heating/cooling steps during the heat treatment process, resulting in additional oxidation/deoxidation cycles.

In another aspect, the invention includes sintered metal oxide articles, and preferably iron oxide articles, made by the method of the invention.

One advantage of the present invention is that it provides sintered metal oxide articles, and preferably iron oxide articles, of high mechanical strength and other desired mechanical properties.

Another advantage of the invention is that it provides sintered metal oxide articles, and preferably iron oxide articles, having interconnected pore structures capable of efficient filtering gases and liquids.

Yet another advantage of the invention is that it provides efficient and economical processes of making sintered metal oxide articles, and preferably iron oxide articles, without the need for sintering additives of any kind and/or high pressures.

DETAILED DESCRIPTION OF THE PREFERRED EMBODIMENTS

The present invention provides sintered metal oxide articles, and preferably iron oxide articles, of desired mechanical properties, such as high strength, and an interconnected pore structure capable of efficient filtering of gases and liquids. In accordance with the invention, metal oxide powder is subjected to a heat treatment to transform at least a portion of the oxide into a different oxide. The heat treatment is conducted at temperatures less than the melting points of the oxides and for suitable holding times to sinter the powder into a unitary oxide article. The powders used in the present invention are said to consist essentially of metal oxide in that such powders are substantially free from other compounds and additives such as binders, reducing agents, and the like.

Heating regimes for sintering are chosen to cause the oxidation and/or deoxidation of the oxide such that it is transformed to a different oxide, with several oxidation/deoxidation cycles possible. Although not wishing to be bound by theory, it is believed that oxygen transport during deoxidation and/or oxidation contributes to effective sintering and the resulting desired mechanical properties and uniformity in appearance and interconnected pore structure of the sintered article body. The invention thus obviates the need for sintering additives and high sintering pressures.

The present invention is described with specific reference to iron oxide articles, and specifically iron oxide filters, that are made by sintering iron oxide powders. The scope of the invention, however, includes articles of other metal oxide materials, of any form and intended use, that are made by sintering metal oxide powders that undergo oxidation and/or deoxidation during the sintering process.

In cited embodiments, sintered iron oxide filters are produced in accordance with the present invention. For example, in one embodiment, hematite ($\alpha$-$Fe_2O_3$) filters are made from magnetite ($Fe_3O_4$) powder. In another embodiment, hematite filters are made from hematite powder, which transforms to magnetite and back to hematite during sintering. In yet another embodiment, magnetite filters are made from hematite powder.

The filters are made in a sintering process wherein metal oxide powder is placed into a mold and hand-pressed into a compact and subjected to a suitable heat treatment to cause sintering into a unitary body and oxidative/deoxidative transformation of the powder. Preferred molds are alumina rings typically having an inner diameter of from about 10 to about 70 mm, and a height of from about 3 to about 60 mm. The powder particles are of any suitable size for sintering such as, for example, about 50 to about 200 microns. Such powders are readily available.

The heat treatment of the invention is selected based on the thermal properties of iron oxides. In air at atmospheric pressure, hematite is stable at elevated temperatures up to about 1350° C. but decomposes to magnetite at higher temperatures up to about 1450° C. Because magnetite begins to decompose to wustite FeO at temperatures above 1450° C., this represents an upper limit of sintering temperatures in atmospheric air. For subatmospheric pressures, suitable sintering temperatures are lower according to the pressure within a vacuum furnace. In cited embodiments of the present invention, vacuum sintering typically occurs at a pressure within the range of about $10^{-4}$ to about $10^{-5}$ torr, wherein hematite begins to decompose to magnetite at about 750° C. and magnetite begins to melt at about 1300° C. The process is optimized on the premise that higher sintering temperatures allow for shorter sintering times. At pressures of about $10^{-4}$ to about $10^{-5}$ torr, efficient sintering occurs at 950° C. to 1250° C., preferably at 1000° C. to 1250° C., and more preferably at 1150° C. to 1200° C.

Embodiments of the present invention are further described with reference to the following non-limiting examples. In all examples, the iron oxide materials, namely hematite and magnetite, are distinguished by stoichiometry and magnetic properties.

EXAMPLE 1

Production of Sintered Hematite Filters from Magnetite Powder

Hematite filters were made from magnetite powder according to an embodiment of the present invention.

Magnetite powder was obtained my milling thin-walled magnetite structures produced in accordance with U.S. Pat. Nos. 5,786,296 and 5,814,164, which are incorporated herein by reference. The powder was separated on commercial sieves into fractions according to the following particle size ranges (in microns): 160 to 100, 100 to 80, 80 to 50 and <50. Portions of each powder fraction were poured into closed-ended molds to form multiple (e.g., at least three) samples of each powder fraction. The molds were in the form of alumina rings having an internal diameter of about 11 mm and a height of about 8 mm, placed on a platinum plate serving as the mold bottom. Each sample was compacted by hand with a metal rod to a density of from about 2.3 to about 3.5 g/cm$^3$, and placed at room temperature into an electrically heated and unsealed furnace for subsequent heat treatment in atmospheric air.

Groups of samples were subjected to the following separate heat treatments (all heating rates were about 2° C. per minute), based on the inventors' finding that the sintering process in air was inefficient below around 1350° C. but efficient for temperatures up to around 1450° C.:

(a) Samples of all powder fractions were heated to about 1300° C. and held for about three hours (thus causing a transformation from magnetite to hematite), then heated to about 1450° C. and held for about 15 minutes (thus causing a transformation from hematite to magnetite), and then furnace cooled (thus causing a transformation from magnetite to hematite) (as used herein, "furnace cooled" refers to cooling by leaving samples in the furnace after sintering and turning off the furnace power), (b) Samples of powder fractions 160 to 100 microns, 100 to 80 microns, and 80 to 50 microns were heated to about 1450° C. and held for about 15 minutes (during which heating, the magnetite transforms to hematite and back to magnetite), then cooled to about 1300° C. and held for about three hours (thus causing a transformation from magnetite to hematite), and then furnace cooled.

(c) Samples of powder fractions 160 to 100 microns were heated to about 1200° C. and held for about three hours (thus causing a transformation from magnetite to hematite), then heated to about 1450° C. and held for about 15 minutes (thus causing a transformation from hematite to magnetite), and then furnace cooled (thus causing a transformation from magnetite to hematite).

As described, each of the heat treatments resulted in more than one transformation between magnetite and hematite. After the samples were cooled to about room temperature, they were removed from the molds. The resulting hematite samples had substantially the same appearance and properties regardless of variations in the heat treatments employed. The sample densities were within the range of about 2.3 to about 3.4 g/cm$^3$, which is about 45 to about 65 percent of hematite bulk density (i.e., corresponding to a porosity of about 55 to about 35 percent, respectively). The samples were mechanically strong enough to be ground by common abrasives, and were characterized by an open interconnected pore structure capable of effective filtration of liquids. This Example thus demonstrates a relatively simple method for making strong, uniform iron oxide filters, particularly hematite filters, in accordance with the present invention.

EXAMPLE 2

Production of Sintered Hematite Filters from Hematite Powder

Hematite filters were made from hematite powder according to an embodiment of the present invention.

Hematite powder was obtained my milling thin-walled hematite structures produced in accordance with U.S. Pat. Nos. 5,786,296 and 5,814,164, which are incorporated herein by reference. The powder was separated according to size and placed into molds according to Example 1.

Samples (e.g., at least three) were heated at a rate of about 2° C. per minute to about 1450° C., held for about three hours (thus causing a transformation from hematite to magnetite), and furnace cooled (thus causing a transformation from magnetite to hematite). The resulting sintered hematite samples could be removed from their molds but were mechanically weak such that they were crushed by slight hand pressure.

In an effort to improve mechanical strength, additional powder samples were heated to about 1300° C. and held for about three hours, then heated to about 1450° C. to about 1500° C., and held for about one hour (thus causing a transformation from hematite to magnetite), and then furnace cooled (thus causing a transformation from magnetite to hematite). The sintered samples showed only a marginal increase in strength. As such, substantially monotonic heating followed by monotonic cooling was found to be inefficient for producing hematite filters from hematite powder.

However, when more cooling/heating steps were added to the heat treatment to provide more oxidation/deoxidation cycles, the resulting hematite samples showed a significant increase in strength. For example, powder samples were heated to about 1250° C. and held for about three hours, then heated to about 1450° C. and held for about 15 minutes (thus causing a transformation from hematite to magnetite), then cooled to about 1250° C. and held for about 15 minutes (thus causing a transformation from magnetite to hematite), then heated again to about 1450° C. and held for about 15 minutes (thus causing a transformation from hematite to magnetite), then cooled again to about 1250° C. and held for about three hours (thus causing a transformation from magnetite to hematite), and then furnace cooled. The resulting sintered hematite samples were strong enough to be ground by common abrasives. Moreover, the resulting samples were uniform in appearance and were characterized by an open interconnected pore structure.

Although not wishing to be bound by theory, the significant increase in filter strength resulting from the several oxidation/deoxidation cycles may be due to oxygen transport within the sintered body contributing to effective sintering, and to the resulting mechanical properties and uniformity of the sintered article body having an interconnecting pore structure.

EXAMPLE 3

Production of Sintered Magnetite Filters from Hematite Powder

Magnetite filters were made from hematite powder according to an embodiment of the present invention.

Hematite powder was made and separated according to size and placed into molds according to Example 2. Samples (e.g., at least three) were placed in a vacuum furnace at a pressure of about $10^{-4}$ to about $10^{-5}$ torr, heated at a rate of about 8–9° C. per minute to about 1210° C. to about 1250° C. and held for about 5 to about 30 minutes (thus causing a transformation from hematite to magnetite), and then furnace cooled while maintaining vacuum (thus preventing a transformation from magnetite to hematite, which would occur in air).

The sintered magnetite filters were easily removed from their molds, and were mechanically strong enough to be ground by common abrasives. The sample densities were within the range of about 2.3 to about 3.4 g/cm$^3$, which is about 45 to about 65 percent of magnetite bulk density (i.e., corresponding to a porosity of about 55 to about 35 percent, respectively), typically increasing with a decrease in the initial hematite particle size. The sintered samples were uniform and were characterized by an open interconnected pore structure.

EXAMPLE 4

Production of Sintered Magnetite Filters from Magnetite Powder

Magnetite filters were made from magnetite powder. Magnetite power was made, separated according to size and placed into molds according to Example 1. Samples (e.g., at least three) were placed in a vacuum furnace at a pressure of about $10^{-4}$ to about $10^{-5}$ torr, heated at a rate of about 8° C. per minute to about 1250° C. and held for about 30 minutes, and then furnace cooled.

In this example, the iron oxide (magnetite) powder did not undergo any transformation to any other iron oxide during sintering. The resulting sintered magnetite filters were significantly weaker and much less uniform than the magnetic filters made from hematite powder as described in Example 3. Notably, the weaker magnetite samples in Example 4 had, on average, higher densities (up to about 4 g/cm$^3$) than the magnetite samples produced in Example 3. While not wishing to be bound by theory, this unusual inverse relation between strength and density indicates that in producing samples of high strength the oxidation/deoxidation cycles are more important than simple densification.

EXAMPLE 5

Evaluation of Sintered Hematite and Magnetite Filters

The hematite and magnetite filters formed according to Examples 1 to 3 were evaluated against standard glass filters with known pore sizes. The pore size of each hematite and magnetite filter was estimated by determining their ability to filter freshly prepared suspensions of Fe(OH)$_3$, CaCO$_3$ and Al(OH)$_3$. Filtration efficiency for all filters was evaluated by measuring the water filter productivity ("WFP"), which is the volume of water filtrated per filter unit surface area per unit time, for a given pressure. The results of the filtration testing are shown in Table I.

The filtration efficiencies for the filters produced in accordance with Examples 1 to 3 were found to be much greater than efficiencies for glass filters of comparable pore sizes. For example, for a hematite filter made in accordance with Example 1 from magnetite powder and having a pore size up to about 40 microns, the WFP was found to be 829 cm$^3$/cm$^2$ min at a pressure of about 10 torr. By comparison, a glass filter having a similar pore size has a WPF of about 100 cm³/cm² min at the same pressure. As another example, for a hematite filter made in accordance with Example 1 from magnetite powder and having a pore size up to about 15 microns, the WFP was found to be 186 cm³/cm² min at a pressure of about 10 torr. By comparison, a glass filter having a similar pore size has a WPF of about 3 cm³/cm² min at the same pressure.

Inspection of Table I reveals several structure-property relationships for the sintered filters of the present invention. For example, for a given sintering process, a decrease in powder particle size results in a decrease in filter pore size and an increase in filter density. Also, a decrease in powder particle size results in a decrease in WFP.

TABLE I

Results of filtration testing for sintered iron oxide filters tested under a pressure of about 10 torr.

| Filter no. | Powder Material | Sintered Filter Material | Powder fraction (microns) | Density (g/cm³) | Pore size (microns) | WFP (cm³/cm²min) |
|---|---|---|---|---|---|---|
| 1 | magnetite | hematite | 160–100 | 2.4 | 40–15 | 829 |
| 2 | magnetite | hematite | 100–83 | 2.7 | 15–10 | 186 |
| 3 | magnetite | hematite | 83–50 | 3.1 | <10 | 56 |
| 4 | hematite | magnetite | 100–83 | 2.5 | 15–10 | 160 |
| 5 | hematite | magnetite | 100–83 | 2.6 | 40–15 | 159 |
| 6 | hematite | hematite | 160–100 | 2.6 | 100–40 | 179 |
| 7 | hematite | hematite | 100–83 | 2.7 | 40–15 | 58 |
| 8 | hematite | hematite | 100–83 | 2.9 | 15–10 | 46 |

The mechanical strength of filters 1 to 3, as listed in Table I, was evaluated on the basis of crush strength. Crush strength was measured by polishing cylindrical filter samples, having diameters of about 10 to about 11 millimeters and heights of about 5 to about 6 millimeters, to obtain smooth, parallel top and bottom surfaces. The samples were wrapped by a polyethylene film, placed in a press (compressive force about 39 kN), and compressed at a rate of about 0.4 atm/sec. The moment of sample crush was distinctly seen on a press manometer. These filters were found to have crush strengths of about 30 atm, about 200 atm and about 260 atm, respectively, showing a strong inverse correlation with powder particle size. This expected inverse correlation is an additional indication that the filters of the present invention possess a normal interconnected pore structure.

The results of the filtration demonstrate that the methods of the present invention result in the production of strong iron oxide articles having an interconnected pore structure suitable for efficient filtering.

The present invention provides a novel method of making sintered metal oxide articles. The sintered articles of the invention are characterized by desired mechanical properties, such as high strength, and an interconnected pore structure. Those with skill in the art may recognize various modifications to the embodiments of the invention described and illustrated herein. Such modifications are meant to be covered by the spirit and scope of the appended claims.

We claim:

1. A method of making a metal oxide article, comprising the steps of:
   pressing powder to form a compact, said powder consisting essentially of a first oxide of the metal; and
   subjecting said compact to a heat treatment, said heat treatment causing said powder to sinter into a unitary body and resulting in the transformation of at least a portion of said first oxide to a second oxide of the metal;
   wherein said step of subjecting said compact to said heat treatment comprises the steps of:
      subjecting said compact to a first temperature such that at least a portion of said first oxide transforms to said second oxide; and
      subjecting said compact to a second temperature after said step of subjecting said compact to said first temperature, thus causing at least a portion of said second oxide to transform to said first oxide; the resultant metal oxide article having an open interconnected pore structure.

2. The method of claim 1, wherein said second temperature is greater than said first temperature.

3. The method of claim 1, wherein said second temperature is less than said first temperature.

4. The method of claim 1, wherein said heat treatment further comprises the step of subjecting said compact to a third temperature after said step of subjecting said compact to said second temperature, thus causing at least a portion of said first oxide to transform to said second oxide.

5. The method of claim 4, wherein said third temperature is greater than said second temperature.

6. The method of claim 4, wherein said third temperature is less than said second temperature.

7. The method of claim 1, wherein at least a portion of said heat treatment is conducted at a subatmospheric pressure.

8. The method of claim 1, wherein at least a portion of said heat treatment is conducted in air at atmospheric pressure.

9. The method of claim 1, wherein the resultant metal oxide article is mechanically strong enough to be ground by common abrasives.

10. A method of making an iron oxide article, comprising the steps of:
    pressing powder to form a compact, said powder consisting essentially of a first iron oxide; and
    subjecting said compact to a heat treatment, said heat treatment causing said powder to sinter into a unitary body and resulting in the transformation of at least a portion of said first iron oxide to a second iron oxide;
    wherein said heat treatment comprises the steps of:
       subjecting said compact to a first temperature such that at least a portion of said first iron oxide transforms to said second iron oxide; and
       subjecting said compact to a second temperature after said step of subjecting said compact to said first temperature, thus causing at least a portion of said second iron oxide to transform to said first iron oxide; the resultant iron oxide article having an open interconnected pore structure.

11. The method of claim 10, wherein
said first iron oxide is hematite;
said second iron oxide is magnetite;
said heat treatment includes the step of heating said compact to a temperature up to about 1250° C.; and
said heat treatment is conducted at a subatmospheric pressure.

12. The method of claim 11, wherein said subatmospheric pressure is within the range of about $10^{-4}$ torr to about $10^{-5}$ torr.

13. The method of claim 10, wherein said step of subjecting said compact to said heat treatment comprises the steps of:
subjecting said compact to a first temperature such that at least a portion of said first iron oxide transforms to said second iron oxide;
subjecting said compact to a second temperature after said step of subjecting said compact to said first temperature, said step of subjecting said compact to said second temperature causing at least a portion of said second iron oxide to transform to said first iron oxide; and
subjecting said compact to a third temperature after said step of subjecting said compact to said second temperature, said step of subjecting said compact to said third temperature causing at least a portion of said first iron oxide to transform to said second iron oxide.

14. The method of claim 13, wherein
said first iron oxide is magnetite;
said second iron oxide is hematite;
said first temperature is up to about 1300° C.;
said second temperature is up to about 1450° C.;
said third temperature is less than about 1300° C.; and
said heat treatment is conducted in air at atmospheric pressure.

15. The method of claim 13, further comprising the step of subjecting said compact to a fourth temperature after said step of subjecting said compact to said third temperature, said step of subjecting said compact to said fourth temperature causing at least a portion of said second iron oxide to transform to said first iron oxide.

16. The method of claim 15, wherein
said first iron oxide is hematite;
said second iron oxide is magnetite;
said first temperature is up to about 1450° C.;
said second temperature is up to about 1250° C.;
said third temperature is up to about 1450° C.;
said fourth temperature is less than about 1300° C.; and
said heat treatment is conducted in air at atmospheric pressure.

17. The method of claim 10, wherein the resultant iron oxide article is strong enough to be ground by common abrasives.

18. A method of making a metal oxide article, comprising the steps of:
pressing powder to form a compact, said powder consisting essentially of a first oxide of the metal; and
subjecting said compact to a heat treatment, said heat treatment causing said powder to sinter into a unitary body and resulting in the transformation of at least a portion of said first oxide to a second oxide of the metal;
wherein said heat treatment comprises the steps of:
subjecting said compact to a first temperature such that at least a portion of said first oxide transforms to said second oxide; and
subjecting said compact to a second temperature, which is greater than said first temperature, after said step of subjecting said compact to said first temperature, thus causing at least a portion of said second oxide to transform to said first oxide.

19. A method of making a metal oxide article, comprising the steps of:
pressing powder to form a compact, said powder consisting essentially of a first oxide of the metal; and
subjecting said compact to a heat treatment, said heat treatment causing said powder to sinter into a unitary body and resulting in the transformation of at least a portion of said first oxide to a second oxide of the metal;
wherein said heat treatment comprises the steps of:
subjecting said compact to a first temperature such that at least a portion of said first oxide transforms to said second oxide;
subjecting said compact to a second temperature, after said step of subjecting said compact to said first temperature, thus at least a portion of said second oxide to transform to said first oxide; and
subjecting said compact to a third temperature after said step of subjecting said compact to said second temperature, thus causing at least a portion of said first oxide to transform to said second oxide.

20. The method of claim 19, wherein said third temperature is greater than said second temperature.

21. The method of claim 19, wherein said third temperature is less than said second temperature.

22. A method of making an iron oxide article, comprising the steps of:
pressing powder to a form a compact, said powder consisting essentially of a first iron oxide of hematite; and
subjecting said compact to a heat treatment at subatmospheric pressure within the range of about $10^{-4}$ torr to about $10^{-5}$ torr, said heat treatment causing said powder to sinter into a unitary body and resulting in the transformation of at least a portion of said first iron oxide of magnetite; said heat treatment including the step of heating said compact to a temperature up to about 1250° C.

23. A method of making an iron oxide article, comprising the steps of:
pressing powder to form a compact, said powder consisting essentially of a first iron oxide; and
subjecting said compact to a heat treatment, said heat treatment causing said powder to sinter into a unitary body and resulting in the transformation of at least a portion of said first iron oxide to a second iron oxide, wherein said step of subjecting said compact to said heat treatment comprises the steps of:
subjecting said compact to a first temperature such that at least a portion of said first iron oxide transforms to said second iron oxide;
subjecting said compact to a second temperature after said step of subjecting said compact to said first temperature, said step of subjecting said compact to said second temperature causing at least a portion of said second iron oxide to transform to said first iron oxide; and subjecting said compact to a third temperature after said step of subjecting said compact to said second temperature, said step of subjecting said compact to said third temperature causing at least a portion of said first iron oxide to transform to said second iron oxide.

24. The method of claim 23, wherein
said first iron oxide is magnetite;
said second iron oxide is hematite;
said first temperature is up to about 1300° C.;
said second temperature is up to about 1450° C.;
said third temperature is less than about 1300° C.; and
said heat treatment is conducted in air at atmospheric pressure.

25. The method of claim 23, further comprising the step of subjecting said compact to a fourth temperature after said step of subjecting said compact to said third temperature, said step of subjecting said compact to said fourth temperature causing at least a portion of said second iron oxide to transform to said first iron oxide.

26. The method of claim 25, wherein
said first iron oxide is hematite;
said second iron oxide is magnetite;
said first temperature is up to about 1450° C.;
said second temperature is up to about 1250° C.;
said third temperature is up to about 1450° C.;
said fourth temperature is less than about 1300° C.; and
said heat treatment is conducted in air at atmospheric pressure.

27. A method of making a metal oxide article, comprising the steps of:
pressing powder to form a compact, said powder consisting essentially of a first oxide of the metal; and
subjecting said compact to a heat treatment, said heat treatment causing said powder to sinter into a unitary body and resulting in the transformation of at least a portion of said first oxide to a second oxide of the metal, furnace cooling said compact while maintaining a vacuum, thus preventing transformation from the second oxide to the first oxide; wherein the resultant metal oxide article has an open interconnected pore structure.

28. The method of claim 27 wherein the first oxide is hematite and the second oxide is magnetite.

29. The method of claim 27, wherein the resultant metal oxide article is strong enough to be ground by common abrasives.

30. A method of making a metal oxide article, comprising the steps of:
pressing powder to form a compact, said powder consisting essentially of a first oxide of the metal; and
subjecting said compact to a heat treatment, said heat treatment causing said powder to sinter into a unitary body and resulting in the transformation of at least a portion of said first oxide to a second oxide of the metal, wherein the resultant metal oxide article has an open interconnected pore structure and is strong enough to be ground by common abrasives.

* * * * *

UNITED STATES PATENT AND TRADEMARK OFFICE
CERTIFICATE OF CORRECTION

PATENT NO.   : 6,461,562 B1                                                           Page 1 of 1
DATED        : October 8, 2002
INVENTOR(S)  : Solntsev et al.

It is certified that error appears in the above-identified patent and that said Letters Patent is hereby corrected as shown below:

Column 10,
Line 27, change "thus" to -- thus causing --;
Line 46, change "oxide of" to -- oxide to a second iron oxide of --.

Signed and Sealed this

Twenty-fifth Day of February, 2003

JAMES E. ROGAN
*Director of the United States Patent and Trademark Office*